United States Patent
Werner et al.

[11] Patent Number: 6,058,246
[45] Date of Patent: May 2, 2000

[54] HEATER AND HEATING INSTALLATION

[76] Inventors: Franz Stefan Werner, A-1090 Vienna, Schwarzspanierstrasse 12; Franz Lackner, A-8970 Schladming, Untere Klaus 233, both of Austria

[21] Appl. No.: 09/043,464
[22] PCT Filed: Sep. 16, 1996
[86] PCT No.: PCT/AT96/00161
  § 371 Date: Mar. 18, 1998
  § 102(e) Date: Mar. 18, 1998
[87] PCT Pub. No.: WO97/11314
  PCT Pub. Date: Mar. 27, 1997

[30] Foreign Application Priority Data

Sep. 18, 1995 [AT] Austria ................... 1540/95
Oct. 2, 1995 [AT] Austria ................... 1620/95

[51] Int. Cl.[7] .................. F24H 7/04; F28D 15/00
[52] U.S. Cl. ............ 392/344; 392/339; 165/104.15; 165/104.19
[58] Field of Search ................ 392/344, 346, 392/351, 354, 339; 165/DIG. 96, 104.15, 104.19

[56] References Cited

U.S. PATENT DOCUMENTS

| 3,301,251 | 1/1967 | Jackson | 126/400 |
|---|---|---|---|
| 3,356,828 | 12/1967 | Furness | 392/344 |
| 3,958,755 | 5/1976 | Cleer, Jr. | |
| 4,153,104 | 5/1979 | Ruder | |
| 4,200,783 | 4/1980 | Ehret | 392/344 |
| 4,474,171 | 10/1984 | Caproon et al. | |

FOREIGN PATENT DOCUMENTS

| 392 152 | 2/1991 | Austria . |
|---|---|---|
| 0 059 976 A2 | 9/1982 | European Pat. Off. . |
| 2030833 | 1/1972 | Germany . |
| 94 01 979 | 12/1994 | Germany . |
| 8201323 | 10/1983 | Netherlands . |

*Primary Examiner*—Teresa Walberg
*Assistant Examiner*—Thor S Campbell
*Attorney, Agent, or Firm*—Akin, Gump, Strauss, Hauer & Feld, L.L.P.

[57] ABSTRACT

The proposal is for a heater consisting of a container with connections for a heating agent circuit for the circulation of a heat conveying medium, in which the container (50, 59) through which the heat conveying medium is to flow is thermally connected to at least one heat store fitted in the heater and preferably in which the container (50, 59) is at least partially fitted in another container (51) of heat-conducting material which can be filled with a heat storage fluid, where the two containers are not in mutual fluid communication and/or the container (50,59) through which the heat conveying medium flows is at least partly adjacent to a solid heat storage core (20). The invention also relates to a heating installation with heaters of the invention making use of solar power.

14 Claims, 4 Drawing Sheets

HEATER AND HEATING INSTALLATION

BACKGROUND OF THE INVENTION

The present invention relates to a heater having a chamber for the circulation of heat conveying medium, which chamber has connections to a heating medium circuit, the chamber preferably at least partly contacting a solid heat storage core. Further, this invention relates to a heating installation having a heater according to the invention using solar energy.

Such heaters or heaters of similar types are for instance used in hot-water central heatings, the heat sources of which are gas firings, oil firings, solid fuel incinerators, but also solar collectors.

DE-U-9401979 discloses a heater having a solid heat storage core through which a heating pipe register extends in a meander-like fashion, hot water flowing therethrough as a heat conveying medium. The heat storage core is penetrated by air passage pipes extending vertically through the heater and being open at their upper and lower ends, which pipes can be closed at their upper opening by means of sliders. These air passage pipes are penetrated by the heating pipe register and allow ambient air to flow upwardly from below through the heater, thereby generating heat convection.

Other known heaters generally consist of a jacket made of sheet metal and having maximum outer surface, inside of which the heat conveying medium heated by the heat source circulates and, while doing so, conveys its heat to the heater jacket and is returned to the heat source after having cooled down. The drawback of such a heater resides in the fact that the heat storage capacity of the heater jacket is rather low. The admission of heat conveying medium to the heater generally takes place intermittently as controlled by a thermostat, so that the heater is constantly subject to a considerable heating and cooling cycle.

SUMMARY OF THE INVENTION

It would be desirable to eliminate the above drawback of the known heater by achieving more uniform heat conveyance by the heater at lower variations of the heater temperature, so that, in particular if solar collectors are used as heat source, but also with others of the above energy sources as heat generators, no undesirable heat variations occur when heating a room.

This invention can overcome above-described problem by providing a heater characterized in that it further includes a container made of heat conducting material to be filled with heat storage fluid, the chamber extending at least partly through the container, the chamber and the container being in a thermally conducting relation without fluid communication.

Thus inside this heater according to the invention there is a large heat storage mass which is heated by the heat conveying medium in the heating circuit and then gradually conveys the heat stored to its environment. The temperature of the heat storage mass inside the heater may be controlled manually or by means of a thermostat, just as the conveyance of heat by the heater, but independent thereof.

Depending on whether more rapid conveyance of heat to the heat storage mass is desired or slow constant withdrawal is to be effected, in the first case conveniently water or an organic heat storage liquid is used as heat storage mass, while in the second case, chamotte, marble or the like are preferred as heat storage core, which is of particular advantage in the case of homes not inhabited for a prolonged period of time, like second homes, in combination with solar collectors so as to avoid damage by frost.

Of course the container for heat storage fluid and the solid heat storage core may also be used in combination, the container for heat storage fluid being empty when the heater is delivered and mounted and only will be filled after it has been mounted. Preferably the container for heat storage fluid has additional sealable openings for deaerating and emptying.

The heater according to the invention is suitable for installation in all known hot-water central heatings as well as for use in solar collector heatings with circulating pumps.

According to one embodiment of the invention the chamber for the circulation of heat conveying medium may take the form of a copper strip heat exchanger with which the container for heat storage medium and/or the heat storage core is penetrated, which assures excellent conveyance of heat to the heat storage fluid and/or the heat storage core.

In order to improve radiation of heat from the heater to its environment it is preferably provided with surface plates made of material with good heat conduction, enlarged by ribs.

It turns out to be favorable for one wall of the container for heat storage fluid to define at least part of an air flow channel inside the heater. In this way the heat storage fluid gradually conveys its heat to the air flowing in the air flow channel, thus heating the room surrounding it by convection.

In order to control the rate of heat conveyance to the air inside the flow channel and thus control the cooling rate of the heat storage medium the invention may provide for the cross-section of the air flow channel to be variable by means of at least one throttle valve which may be actuated manually or controlled in dependence on temperature.

The heated air inside the flow channel is to convey its heat as convection heat to the room surrounding it. It may be undesirable to heat the wall of the flow channel and in particular to radiate heat to the outside through the heated flow channel wall if the heater is arranged close to an outer wall of the house. In this case it is convenient for the air flow channel to be provided with a heat-insulating layer on its surface facing the outer side of the heater.

According to the invention water or an organic heat storage liquid (heat storage oil) may be used as heat storage fluid, while chamotte, marble or the like may be considered for the solid heat storage core.

According to one embodiment of the invention it is provided that the volume of the chamber for the circulation of heat conveying medium be considerably, in particular at least three times, higher than that of the container for heated medium.

The invention also relates to a heating installation comprising one or several heaters according to the invention, which is/are connected, via a supply and a return, to a heat source operated with fossil fuels or electrical power, on the one hand, and with at least one solar collector, on the other hand, the heat source and the solar collectors) being operable separately or in combination with each other.

Preferably a buffer storage is furthermore interposed in the heat circuit for the intermediate storage of surplus heated heat conveying medium.

BRIEF DESCRIPTION OF SEVERAL VIEWS OF THE DRAWINGS

The invention will now be described in more detail by way of examples thereof with reference to the attached drawings. In the drawings

DETAILED DESCRIPTION OF THE INVENTION

Figure 1:
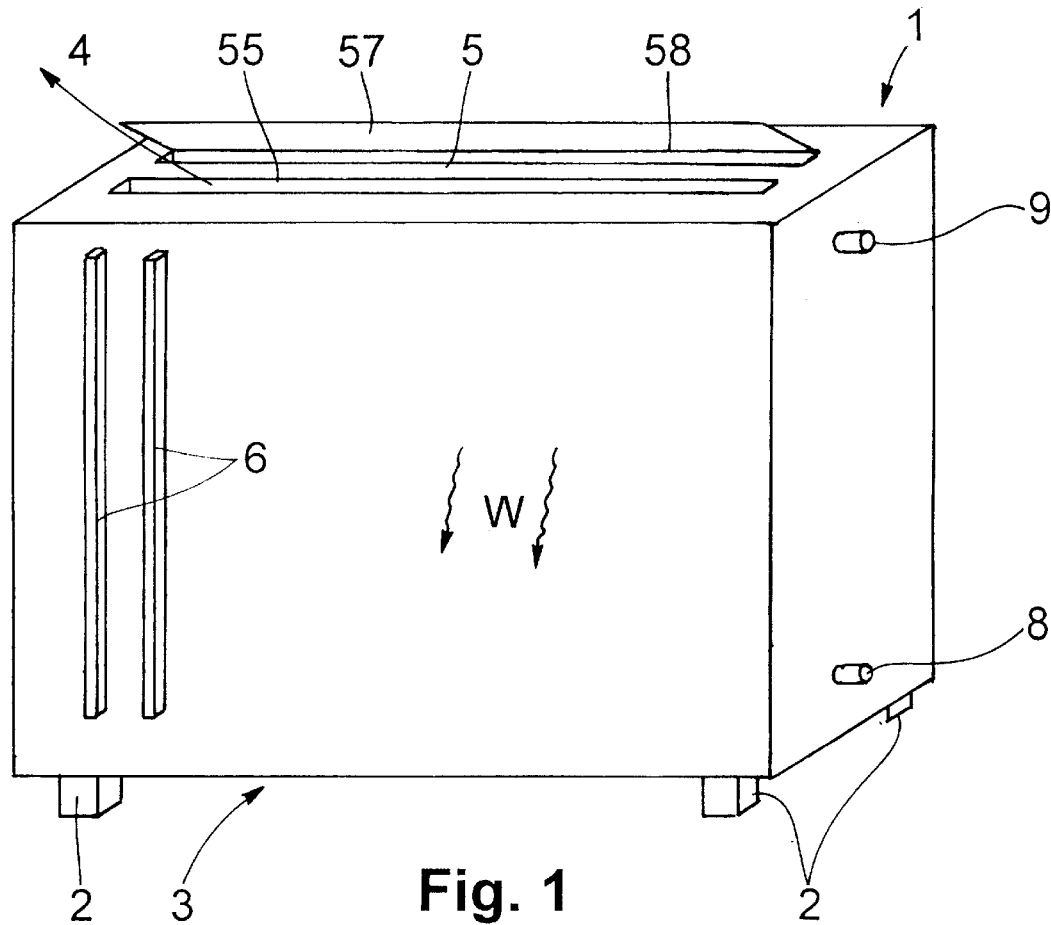
FIG. 1 is a perspective view of a heater according to the invention.

The heater according to invention of FIG. 1 generally takes the form of a right parallelepiped and rests on legs 2 enabling the supply of incoming air to the bottom of the heater (as indicated by arrow 3). The incoming air passes upwards through channels inside the heater, in the course of which it is heated and finally leaves heater 1 through slits 5 on its top side as heated outgoing air (arrow 4). Metal ridges 6 are provided on the outer side of the heater in order to increase the radiation surface. The number and size of these metal ridges may be varied as necessary. The heat radiated by the outer surfaces of the heater is symbolized by arrows W. The heater is complete with a hot water supply connection 8 and a water return 9. An air flow channel 55 leading to the top side of the heater may be closed by a valve 57 attached to the heater by means of a hinge 58 and thus pivotable. The position of valve 57 may either be adjusted manually or controlled automatically depending on temperature.

Figure 2:
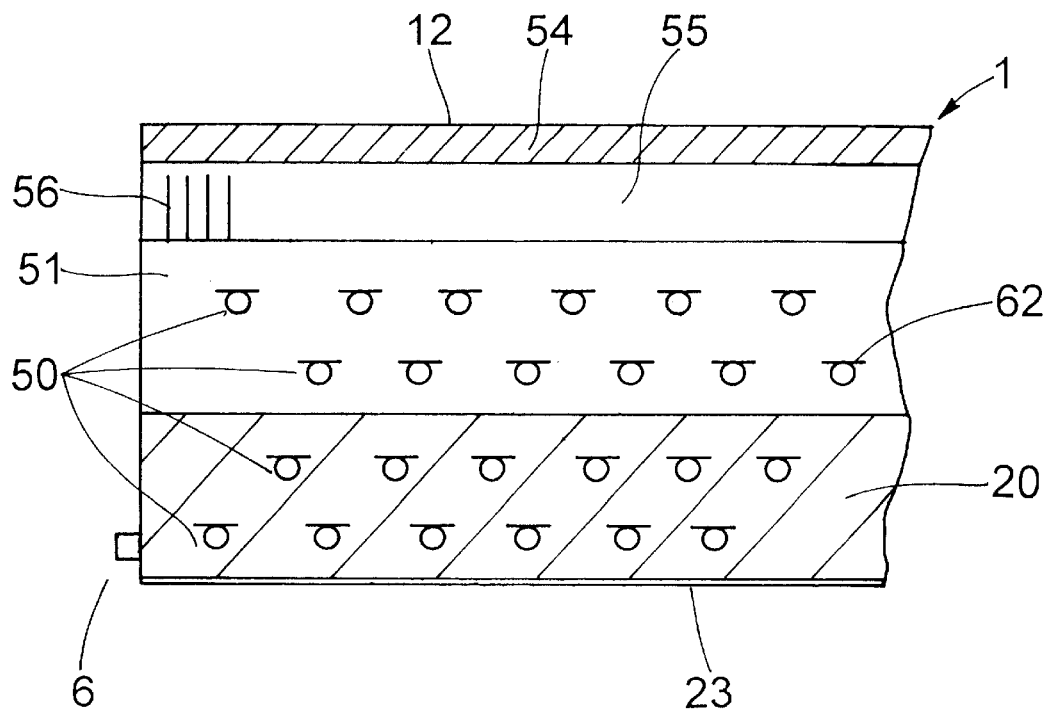
FIG. 2 is a cross-section of the same heater according to the invention.

Next referring to FIG. 2, the cross-section of a heater 1 according to the invention is shown. It consists of a metal plate 23, which constitutes an outer surface of the heater and on the outer side of which metal ridges 6 are arranged in order to increase the radiation surface. Metal plate 23 contacts a heat storage layer 20 so as to conduct heat.

Heat storage layer 20 consists of set liquid chamotte. A plurality of upright heat exchange pipes 50 of a copper strip heat exchanger are cast therein. A container 51 for heat storage fluid adjacent the solid heat storage layer 20 is penetrated with these heat exchange pipes 50 as well.

On its wall facing away from the chamotte core, which wall defines part of an air flow channel 55, container 51 for heat storage fluid is provided with lamellas 56 protruding into the air flow channel 55 so as to improve the conveyance of heat. The wall of container 51 and its lamellas 56 consist of material having good heat-conduction. On its side opposite container 51, the air flow channel is defined by a layer 54 of heat-insulating material, on the outer side of which a metal plate 12 is arranged. Furthermore thermostats may be provided in container 51 for heat storage fluid and in heat storage layer 20.

Container 51 may be filled with heat storage fluid via a sealable opening not shown, filling advantageously being carried out only after the heater has been installed. In most cases water will be used as heat storage fluid, but it is also possible to use an organic heat storage means. For instance, paraffin, alkyl benzene, phenyl compounds, high-boiling esters and silicon oils may be used.

Figure 3:
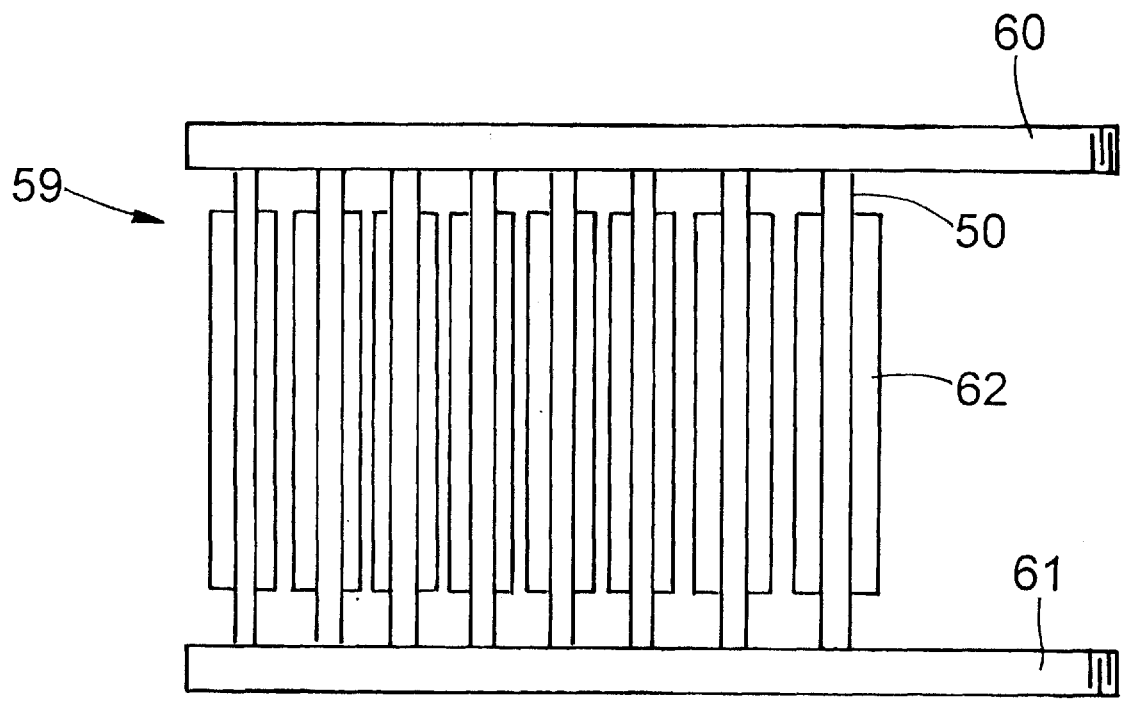
FIG. 3 is a side view of a copper strip heat exchanger used.

FIG. 3 illustrates a copper strip heat exchanger 59 advantageously used in the heater according to the invention. It consists of a supply pipe 61, a return pipe 60, and a plurality of parallel heat exchange pipes 50 in spaced relationship to each other, communicating supply pipe 61 and return pipe 60 so that a heating medium may flow through the supply pipe, the heat exchange pipes and the return pipe. The walls of the heat exchanger are made of copper, the individual pipes are connected by ultrasonic welding. Elongate copper strips 62 are welded to the heat exchange pipes 50 in longitudinal direction so as to increase the efficiency of heat conveyance to their surroundings.

What follows is an example for dimensioning a heater according to the invention, its exterior dimensions being 100×75×23 cm, the width of its lamellas being 3 and 2 cm, respectively, and the surface of its ridges 6 being 600 cm$^2$ for each ridge. This gives a total area of all heat radiating surfaces of 9.6 m$^2$, which is to be equated to the radiating surface of a low temperature floor heating, so that a surface temperature of the heater of 40° C. is sufficient for heating a room having an area of 10 m$^2$. The dimensions of the container for heat storage fluid are 100×75×10 cm, which gives a filling volume of 75 1, the dimensions of the chamotte layer are 100×75×6 cm. As chamotte has a density of about 1.8 gm/cm$^2$, the chamotte layer thus has a weight of 81 kg. This indicates that the storage heater according to the invention has a transport weight of less than 100 kg, thus enabling transportation and installation to be carried out by two men. After filling with heat storage fluid the heat storing mass is almost doubled, however. The heat exchanger advantageously used in the heater is provided with 24 heat exchange pipes having a length of 50 cm and a diameter of 12 mm, of which twelve are arranged inside container 51 and twelve in the chamotte layer. Thus the filling volume of all 24 heat exchange pipes amounts to 1.36 1, and together with the supply and return pipes, the heat exchanger has a total filling volume of 1.5 1. This low filling amount enables a drastic reduction of the heat medium amount in the heat circuit.

Figure 4:
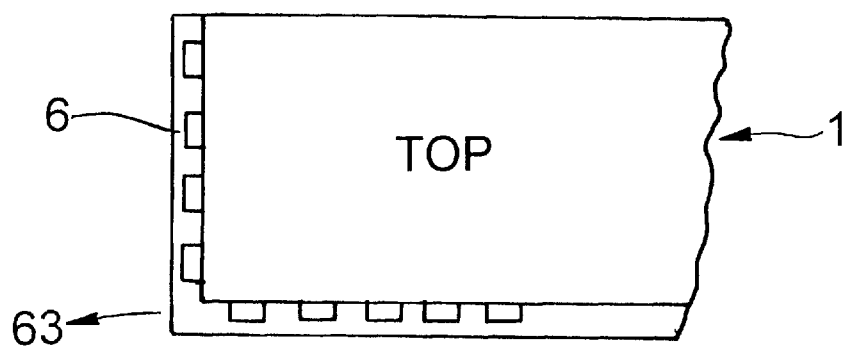
FIG. 4 is a plan view of a detail of the heater of FIGS. 1 and 2.

FIG. 4 shows a special configuration of the top side of heater 1, wherein a lid 63 forms the cover of the heater, the lid protruding beyond the metal ridges 6 and being provided with a radiation foil. The lid is spaced apart from the top sides of the chamotte core and the container for liquid heat storage medium, so that there is an air gap therein between, which in combination with the valve controlling the convection flow, arranged in the lid and not shown in the drawing, improves the convection flow. For reasons of clarity the lid is shown as transparent in the drawing, while in reality it is made of metal.

The heater according to the invention is heated by the heat conveying medium, which, in its turn, is heated in a gas firing, oil heating or the like, the supply of heat conveying medium into the Cu heat exchangers being throttled or shut off as controlled by a thermostat after the core or the outer wall of the jacket of the heater have reached the desired temperature, to be resupplied after the temperature has fallen below a fixed value.

Figure 5:
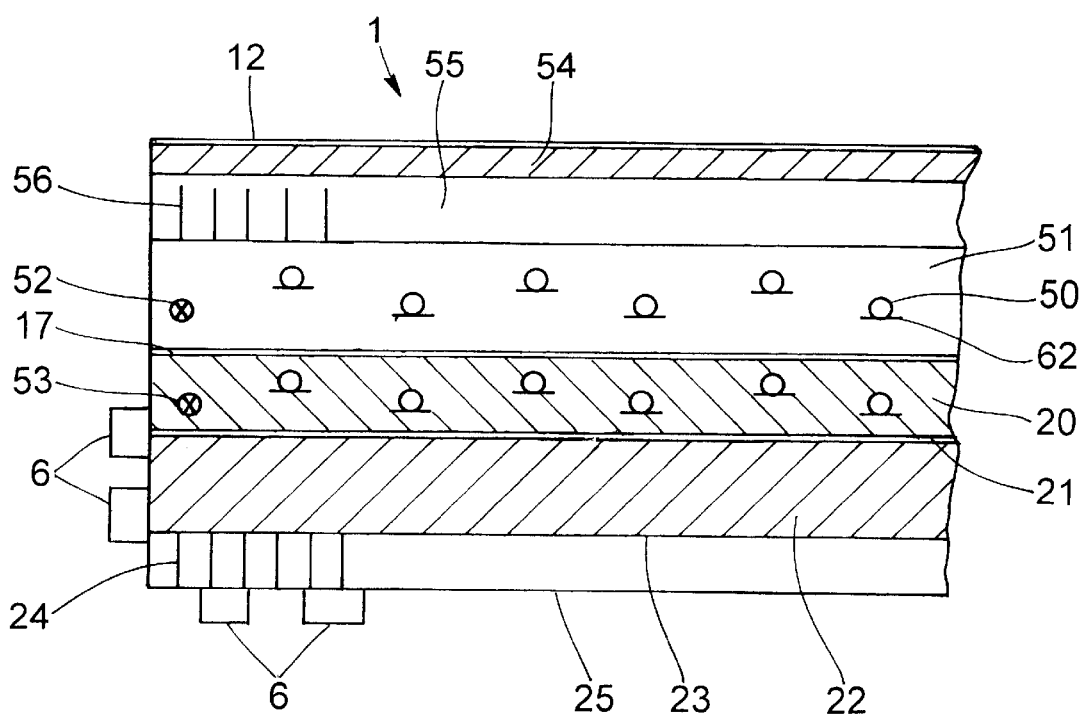
FIG. 5 shows a further embodiment of the heater according to the invention.

Now referring to FIG. 5, it shows a second embodiment of a heater 1 according to the invention in cross-section. It consists of a metal plate 25 constituting an outer surface of the heater, on the outer sides of which metal ridges 6 are arranged in order to increase the radiation surface. Metal plates 25 are spaced in parallel from a further metal plate 23 contacting chamotte layer 22 so as to conduct heat. The space between metal plates 23 and 25 is bridged by lamellas 24 connected to plate 23 as well as plate 25 to act as thermal bridges. Lamellas 24 again serve to increase the heat radiation surface.

Adjacent to metal plate 23 there is a first chamotte layer 22, and adjacent thereto a second chamotte layer 20. An electric resistance heating mat 21 operable with direct current from solar cells is arranged between these two chamotte layers. Chamotte layer 20 consists of set liquid chamotte. A plurality of upright heat exchange pipes 50 of a copper strip heat exchanger are cast therein. A container 51 for heat conveying fluid adjacent chamotte layer 20 is penetrated with these heat exchange pipes 50 as well, a second electric resistance heating mat 17 being arranged between container 51 and chamotte layer 20, which mat may be operated with alternating current from the mains supply. On its wall opposite heating mat 17, which wall defines part of an air flow channel 55, container 51 for heat conveying fluid is provided with lamellas 56 protruding into air flow channel 55 for improved heat conveyance. The wall of container 51 and its lamellas 56 consist of material having good heat-conduction. On its side opposite container 51 the air flow channel is defined by a layer 54 of heat insulating material, on the outer surface of which a metal plate 12 is arranged. Furthermore thermostats 52 and 53 are arranged in container 51 for heat conveying fluid and in chamotte layer 20, respectively. Container 51 may be filled with heat conveying fluid via a sealable opening not shown.

Figure 6:
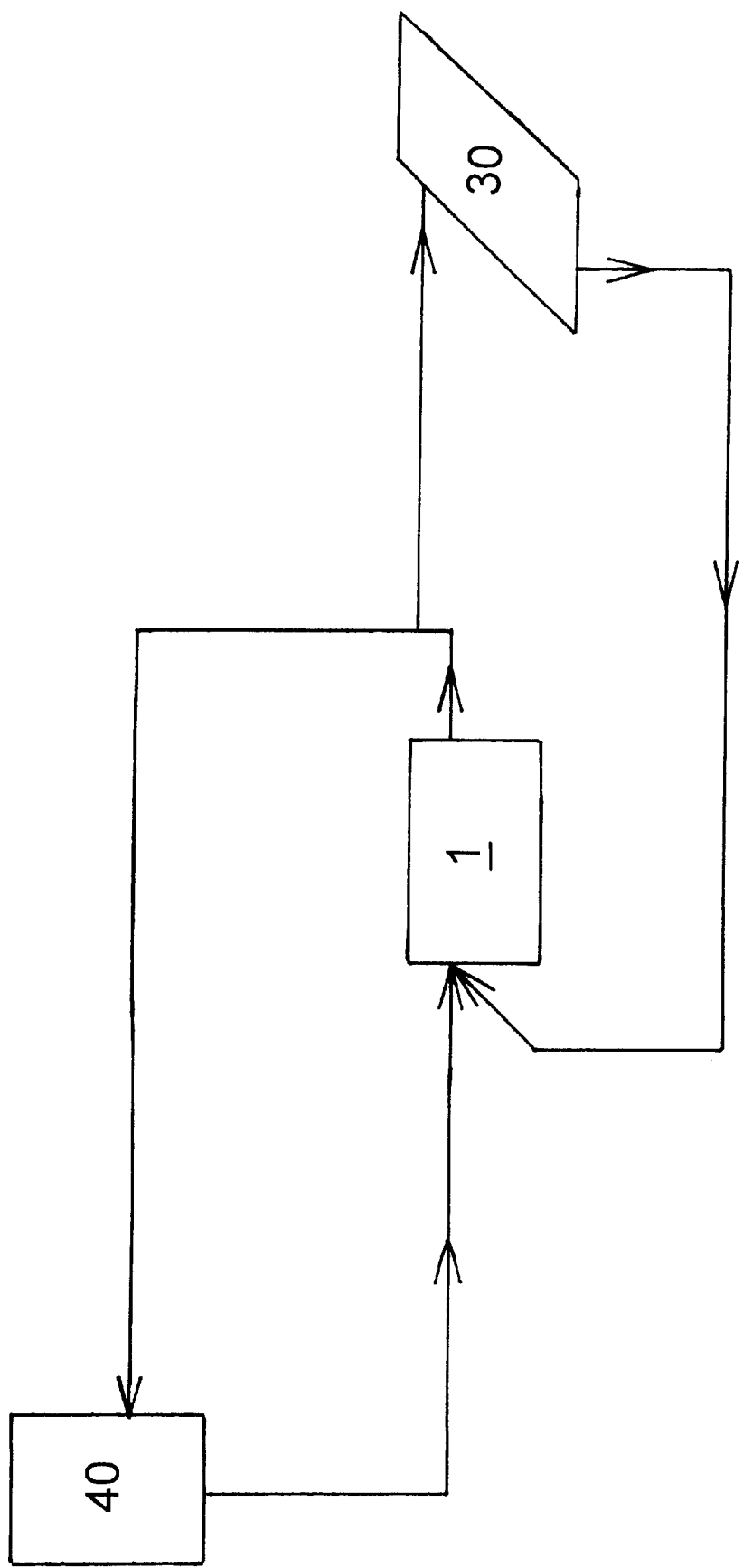
FIG. 6 shows a functional diagram of a heating installation with a heater according to the invention.

Now referring to FIG. 6, a functional diagram of a heating installation having a heater 1 according to the invention will be described. The supply pipe of this heater is connected to a conventional heating source 40 operated with gas, oil, etc., and via this pipe is supplied with hot water, which is returned to heating source 40 after passing the heater. At the same time heater 1 is connected to the hot water flow pipe of a solar collector 30, a return from the heater return to the solar collector inlet being furthermore present. Thus heater 1 is connected to two different heating circuits, which may be operated in combination or separately. Surplus hot water from the solar collector may be piped into buffer storage or a heat exchanger for the heating of water for domestic use. When using heaters according to the embodiment of FIG. 5, solar cells may furthermore be provided for the generation of direct current for operating the electric resistance heating elements in the heaters.

We claim:

1. A heater having a chamber for the circulation of heat conveying medium, which chamber has connections to a heat conveying medium, the chamber preferably at least partly contacting a solid heat storage core (20), characterized in that the heater (1) further has a container (51) made of heat conducting material to be filled with heat storage fluid, the chamber (50, 59) at least partly extending through the container, the chamber (50, 59) and the container (51) being in a thermally conducting relation without fluid communication.

2. The heater according to claim 1, characterized in that the chamber for the circulation of heat conveying medium takes the form of a copper strip heat exchanger (59) with which container (51) for heat storage fluid and/or heat storage core (20) is/are penetrated.

3. The heater according to claim 1, characterized in that it is provided with plates (25) of material with good heat-conduction, preferably enlarged by ribs (6), on its surface.

4. The heater according to claim 1, characterized in that one wall of the container (51) for heat storage fluid defines at least part of an air flow channel (55) in heater (1).

5. The heater according to claim 4, characterized in that the cross-section of air flow channel (55) is variable by at least one throttle valve (57) which may either be adjusted manually or controlled automatically depending on temperature.

6. The heater according to claim 4, characterized in that the air flow channel (55) is provided with a heat insulating layer (54) on its surface facing the outer side of the heater.

7. The heater according to claim 1, characterized in that the solid heat storage core (20) consists of chamotte or marble.

8. The heater according to claim 1, characterized in that the heat storage fluid is water or an organic heat storage liquid.

9. The heater according to claim 1, characterized in that the container (51) for heat storage fluid is provided with at least one sealable opening for filling, deaerating or emptying the container.

10. The heater according to claim 1, characterized in that the volume of the container (51) for heat storage fluid is considerably, in particular at least three times, higher than that of the chamber (50,59) for the circulation of heat conveying medium.

11. The heater according to claim 1, characterized in that furthermore provision is made for at least one electric resistance heating element (17,21), which is arranged on the container (51) for heat storage fluid and/or on and in the heat storing core (20), respectively.

12. The heater according to claim 11, characterized in that at least one electric resistance heating element (17,21) may be switched to be operable either by direct current, preferably generated by solar cells, or by alternating current from the mains supply.

13. A heating installation, comprising one or several heaters according to claim 1, which is/are connected, on the one hand, to a heat source (40) operated with fossil fuels or electric power via a supply and a return, and, on the other hand, to at least one solar collector (30), heat source (40) and solar collectors (30) being operable separately or in combination.

14. The heating installation according to claim 13, characterized in that furthermore a buffer storage is interposed in the heating circuit for intermediate storage of surplus heated heat conveying medium.

* * * * *